United States Patent
Fuhrer

(10) Patent No.: US 9,266,275 B2
(45) Date of Patent: Feb. 23, 2016

(54) DEVICE AND METHOD FOR BLOW MOULDING CONTAINERS

(75) Inventor: Kaj Fuhrer, Tegernheim (DE)

(73) Assignee: KRONES AG, Neutraubling (DE)

( * ) Notice: Subject to any disclaimer, the term of this patent is extended or adjusted under 35 U.S.C. 154(b) by 693 days.

(21) Appl. No.: 13/566,040

(22) Filed: Aug. 3, 2012

(65) Prior Publication Data

US 2013/0037996 A1 Feb. 14, 2013

(30) Foreign Application Priority Data

Aug. 11, 2011 (DE) .......................... 10 2011 080 833

(51) Int. Cl.
| | |
|---|---|
| B29C 49/36 | (2006.01) |
| B29C 49/46 | (2006.01) |
| B29C 49/42 | (2006.01) |
| B29C 49/48 | (2006.01) |
| B29C 49/10 | (2006.01) |

(52) U.S. Cl.
CPC .................. B29C 49/42 (2013.01); B29C 49/46 (2013.01); B29C 49/4823 (2013.01); B29C 49/10 (2013.01); B29C 49/36 (2013.01); B29C 2049/4638 (2013.01); B29C 2049/4641 (2013.01)

(58) Field of Classification Search
CPC ............................ B29C 49/36; B29C 49/4823
USPC ........................................................ 425/540
See application file for complete search history.

(56) References Cited

U.S. PATENT DOCUMENTS

| | | | |
|---|---|---|---|
| 3,233,416 A * | 2/1966 | Rainwater et al. ............ | 425/526 |
| 3,764,250 A | 10/1973 | Waterloo | |
| 5,153,007 A * | 10/1992 | Watkins ......................... | 425/143 |
| 8,579,622 B2 * | 11/2013 | Hoellriegl et al. ............. | 425/144 |
| 2011/0262574 A1 | 10/2011 | Hoellriegl et al. | |
| 2012/0187609 A1 | 7/2012 | Rossmann et al. | |

FOREIGN PATENT DOCUMENTS

| | | |
|---|---|---|
| CN | 1096244 A | 12/1994 |
| CN | 102233668 A | 11/2011 |
| DE | 1 99 34 320 A1 | 1/2001 |
| DE | 20309576 U1 | 10/2003 |
| DE | 10357247 A1 | 7/2005 |
| DE | 102005000681 A1 | 7/2006 |
| DE | 102007005489 A1 * | 7/2007 |
| DE | 102009005142 A1 | 7/2010 |

(Continued)

OTHER PUBLICATIONS

Machine translation of EP 1537976 A1 dated Jun. 2005 obtained from the esp@ce.net webpage.*
Machine translation of DE 102007005489 A1 dated Jul. 2007 obtained from the esp@ce.net webpage.*
Office Action, Chinese patent application No. 201210283276.6, issue date Feb. 25, 2015.

(Continued)

Primary Examiner — Robert B Davis
(74) Attorney, Agent, or Firm — Marshall, Gerstein & Borun LLP

(57) ABSTRACT

Described are a device and a method for blow molding containers, whereby the device contains a plurality of blow-molding stations, each provided with at least one blow mold, whereby these blow-molding stations are arranged on a carrier, such as a blowing wheel. The blow-molding stations are supplied with an operating medium by means of a tempering device. To simplify the design and optimize the control, it is proposed to arrange the tempering device on the carrier such that the tempering device runs along with the carrier.

12 Claims, 3 Drawing Sheets

(56) References Cited

FOREIGN PATENT DOCUMENTS

| | | |
|---|---|---|
| DE | 102010028253 A1 | 10/2011 |
| DE | 102010032965 A1 | 2/2012 |
| EP | 1288557 A2 | 3/2003 |
| EP | 1537976 A1 | 6/2005 |
| EP | 2208606 A2 | 7/2010 |
| EP | 2383101 A2 | 11/2011 |
| WO | WO-2011112307 A1 | 9/2011 |

OTHER PUBLICATIONS

Extended European Search Report for Application No. EP 12171620.3 dated Apr. 8, 2014.
Translation of First Chinese Office Action for Application No. 201210283276.6, issued Apr. 21, 2014.
German Search Report for German Patent Application No. 102011080833.7, dated Apr. 27, 2012.
Search report for EP 12 17 1620, dated Nov. 27, 2013.

* cited by examiner

DEVICE AND METHOD FOR BLOW MOULDING CONTAINERS

CROSS-REFERENCE TO RELATED APPLICATION

The present application claims the benefit of priority to German Patent Application 102011080833.7, filed Aug. 11, 2011, which is incorporated herein by reference in its entirety.

TECHNICAL FIELD

The present disclosure relates to a device and a method for blow moulding containers.

BACKGROUND

Blow-moulding machines/stretch blow-moulding machines are frequently provided with a transport means, usually in the form of a blowing wheel that incorporates a multiplicity of blow-moulding stations. Each blow-moulding station contains mould carriers, mould carrier shells and/or moulds that usually accommodate preforms and that usually hold these preforms at the neck while the heated preforms are, by means of the injection of compressed air and usually also by means of the insertion of a stretching rod, enlarged, stretched and adapted to the inner wall of the moulds in order to form the desired final shape. This process, however, requires exact temperature control with precise heating and, where necessary, precisely such cooling. In the case of solutions of the hitherto existing type, the mould carrier, the mould carrier shell and/or the moulds of a stretch blow-moulding machine are tempered centrally depending on the process requirements. This is brought about by means of a heating and/or cooling module that is arranged outside of the blowing wheel. By means of this heating and/or cooling module, an operating medium (oil, water, other mixtures) is tempered and conducted from the central tempering module and on to the rotating blowing wheel by means of a rotary distributor. The rotary distributor has a multiplicity of connection points, from which individual lines (inlets and outlets of the operating media) are led to the individual mould carriers, mould carrier shells and/or moulds (also for neck cooling). The known development, however, requires high assembly costs for the distribution hoses and hose couplings, quality and inspection costs, complexity costs of the hoses/hose packages and, in particular, a high energy expenditure for the tempering due to the temperature losses, particularly during the relatively long transport from the tempering device to the blow-moulding station. The complexity costs are high, because different hose packages with different lengths have to be designed, purchased and assembled for each partition of the blowing wheel. This also applies to the spare part and service business. Because the hoses have to sustain high pressures, high-grade hoses in sufficient lengths must also be installed here.

The preforms, which are heated in an oven, are brought into a blow-moulding machine where they are stretched and blown, by means of compressed air, into containers. The preforms have a precisely adjusted temperature profile, in order to make it possible to carry out the stretch blow moulding process optimally. However, between the removal from the oven and the insertion into the blow-moulding station in the form of the placement into the blow mould, there exists a transfer section that is not especially well controlled on the part of the parameters for the temperature of the preform. Depending on the ambient temperatures (which can fluctuate greatly during the course of a day), the preform cools off in the transfer section differently and possibly no longer has the optimal temperature (distribution) for the stretch blow moulding process. After the preform is stretch blow moulded into a container, the finished container remains in the mould. The process of moulding the container from a preform requires only a short time, the longer time of the entire process being accompanied by simultaneous energy removal in the form of heat for the stabilization of the container in the mould.

SUMMARY

The basis of the present disclosure is consequently formed by the aspect of providing a device and a method for blow moulding containers that is more economical to manufacture and more reliable to operate.

The disclosure provides, in one arrangement, a device for blow moulding containers having a plurality of blow-moulding stations, each provided with at least one blow mould, wherein these blow-moulding stations are arranged on a driven carrier and are supplied with operating medium by means of a tempering device, wherein the tempering device is arranged on the carrier such that the tempering device runs along with the carrier, and in another arrangement, a method for blow moulding containers, wherein a plurality of blow-moulding stations, each provided with a blow mould, are transported on a driven carrier and supplied with operating medium by means of a tempering device, wherein the tempering device runs on the carrier along with the same.

Advantageous further developments of the disclosure can be derived from the dependent Claims.

Embodiments of the disclosure are explained in more detail in the following, using the drawings. Shown are:

DETAILED DESCRIPTION

By means of the development according to the disclosure, the complex media distribution ring and the large central tempering unit are eliminated. The expenditure for the transport paths for the operating medium are greatly reduced. Due to the shortening of the transport paths, energy losses should furthermore be less anticipated. This especially has an affect during the start-up and after restarting after a machine stop, because less operating medium is circulating. This in turn increases the response time for target-oriented tempering, i.e., no long lead-times are necessary in order to adjust the desired tempering at the moulds, the mould carrier shell and/or the mould carrier.

Due to the development according to the disclosure, it is possible in a simple manner to supply the blow-moulding stations with operating medium independently of one another. Individual blow-moulding stations or groups of blow-moulding stations can thereby be selectively switched off or on. It is also possible to operate individual blow-moulding stations at different temperatures. The disclosure can be used both for providing heating medium and/or cooling medium as well as for providing climatized blowing air. Such a blow-moulding station can also be used with linear machines. In this case, as well, it is possible to use the advantages of a distributed media supply, i.e., a media circuit with individual regulation of the tempering for each blow-moulding station.

The tempering device can have a central provision device for the operating medium, whereby this central provision device runs along with the carrier and supplies all blow-moulding stations arranged on this carrier.

It is also possible, however, to assign each blow-moulding station or each group of blow-moulding stations its own provision device that supplies only this particular blow-moulding station or this particular group of blow-moulding stations.

Each blow-moulding station furthermore has its own, independent tempering control cycle that ensures, firstly, that the blow-moulding station is supplied as needed and, secondly, that there is the possibility of operating each blow-moulding station with a different operating medium and/or at a different temperature. The medium can thereby also be ambient air that is distributed/swirled by means of a distributed/local ventilator, i.e., that is not guided in a closed circuit.

A temperature sensing device is preferably provided on each blow-moulding station in order to make it possible to determine the temperature at that location.

The use of a Klein pump for distributing the operating medium each blow-moulding station is especially advantageous. Pumps of that kind are not very complex, but have a short response time and allow a broad range of possible variations for temperature adjustment.

Figure 1:
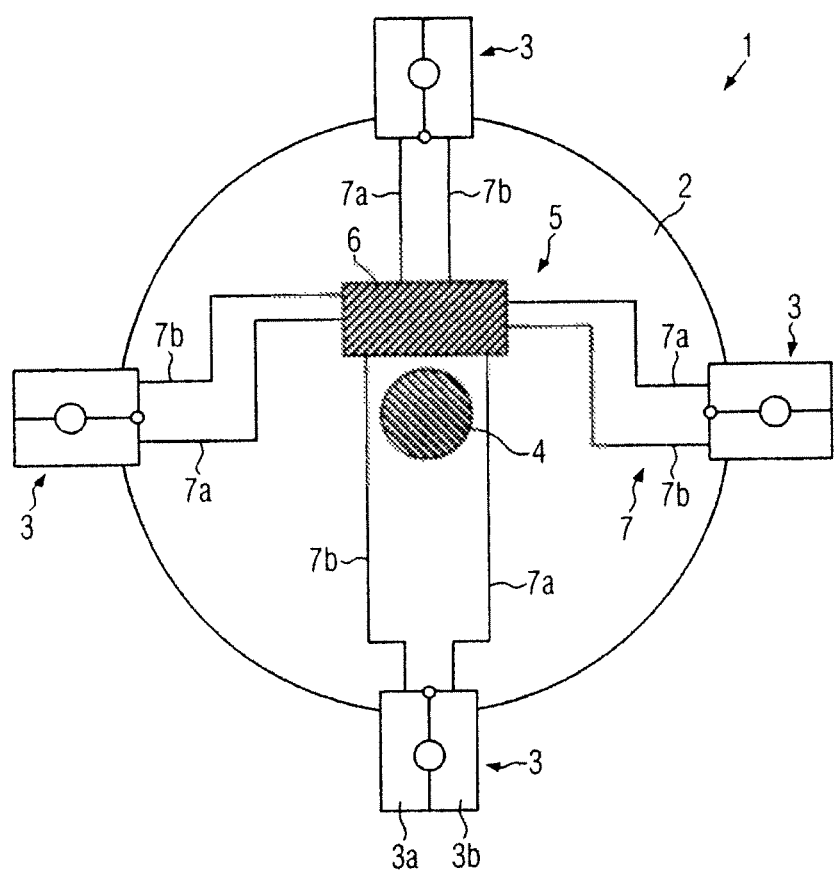
FIG. 1 is a greatly schematized top view onto a first embodiment of the disclosure.

Turning now to the drawings, in a greatly simplified schematic depiction, FIG. 1 shows a top view on to a device 1 for blow moulding containers, such as bottles made of plastic or the like, for example. Such devices are known and do not have to be explained in more detail. Blow moulding devices use moulds with an interior corresponding to the desired contour of the container, into which interior a so-called preform is inserted. The preform, in a heated state, is expanded by a compressed gas blown into its interior to the point that it lies against the inner wall of the mould with the formation of the desired, thin wall thickness. Where applicable, this process can be supported by mechanical stretching over a so-called stretching rod.

During the blow moulding, it is necessary to heat the moulds and, where applicable, to cool them, for example, in the neck area, during the so-called "hot fill" process. It is furthermore desirable to climatize the blowing air, likewise by means of increasing or reducing the temperature.

The device 1 according to the disclosure contains a carrier 2, that is provided with a multiplicity of blow-moulding stations 3 and that transports these from a supplier (e.g., oven or oven outlet), which is not shown, for inserting preforms into the moulds up to a removal unit at which the finished containers are removed. The blow moulding process takes place between the supplier and the removal unit.

The moulds are identified here by mould halves 3a, 3b, but can have any known construction.

In the depicted embodiment, the carrier 2 is formed as a blowing wheel that sits on a shaft 4 and that is driven in a rotating manner around a rotational axis that extends perpendicularly to the drawing plane of FIG. 1.

The device 1 contains a tempering device 5 that contains a provision device 6, e.g., a supply, for at least one operating medium. The tempering device 5 sits on the carrier 2 and is led along with the carrier 2 in its movement between the supplier and the removal unit. The tempering device 5 is connected to the moulds 3, each by means of its own operating medium circuit 7 with the supply line 7a and the outlet line 7b.

The tempering device 5 can, however, also provide a plurality of different operating media, such as, for example, a heating medium, such as water, oil or other mixtures, or a cooling agent. In this case, each provision device 6 of each operating medium is connected with its own circuit 7 to each individual blow-moulding station 3.

Each blow-moulding station 3 is assigned a temperature sensor (not shown) that can determine the actual need in the vicinity at each individual blow-moulding station 3.

The temperature sensor is a component of a separate, independent tempering control cycle of this particular blow-moulding station 3, so that each individual blow-moulding station 3 can be tempered independently of the other blow-moulding stations. Naturally a separate tempering control cycle is provided for each operating medium circuit, so that heating and cooling requirements within the same blow-moulding station 3 can be regulated in a manner decoupled from each other.

Furthermore, for each mould half 3a, 3b or mould shell or mould carrier, a separate operating medium circuit or separate operating medium circuits can be provided.

Each operating medium circuit 7 is served with operating medium by means of a commercially available Klein pump. The pump is regulated with the controller according to the desired temperature profile. In this way, it is possible selectively to switch individual temperature circuits off or on, or selectively to change the temperature of individual tempering circuits to individual blow-moulding stations 3. Where applicable, the blow-moulding stations can also be combined into groups and regulated together as a group. If, for example, in the case of 5 blow-moulding stations of 24 stations no critical temperatures have been determined at the neck of the container, precisely these 5 can be switched off. If the Klein pumps are used, the temperature in individual circuits can be selectively reduced and/or increased in a simple and uncomplicated manner by changing the pump speed and consequently the operating medium throughput rate.

The provision device 6 of the tempering device 5 can have a customary electric heating device, but this can also take place by means of fuel cells (e.g., refillable methanol tank), microwave, induction heating or the feed of convection heat/radiation.

Figure 2:
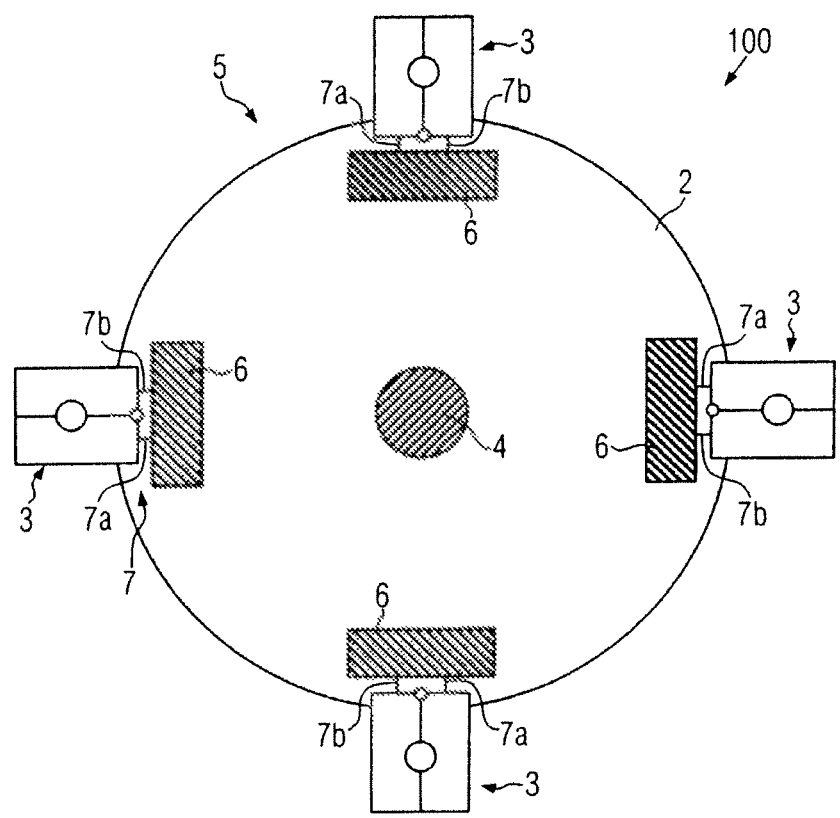
FIG. 2 is a greatly schematized top view on to a second embodiment of the disclosure.

FIG. 2 shows a further embodiment of a device 100 according to the disclosure, whereby the device 100 differs from the device 1 according to FIG. 1 only in the details described in the following. The device 100 contains a tempering device 5 that has a separate provision device 6 for each blow-moulding station and for each operating medium. The provision device 6 in turn is connected to the assigned blow-moulding station 3 by means of at least one separate circuit 7 with supply line 7a and outlet line 7b. Because of the physical proximity of the provision device 6 and the blow-moulding station 3, the line overhead/hose overhead here is further reduced; under some circumstances, the supply line and outlet line can be formed simply by means of bore holes in the moulds 3a, 3b. The provision device 6 can, for example, be a hollow space filled with an operating medium, whereby the hollow space in turn is connected to the associated circuit of the associated blow-moulding station 3 by means of a Klein pump. In the case of the distributed arrangement of the provision devices shown in FIG. 2, it is furthermore possible to introduce the operating medium into the mould carrier/into the mould in a sealed manner and heat the same by means of microwave. In this case, no pump at all would be needed for circulating the medium in a heating circuit.

In the case of the described distributed solution on the carrier 2, the hosing can be integrated or assembled into the blow-moulding station as a standard component.

Figure 3:
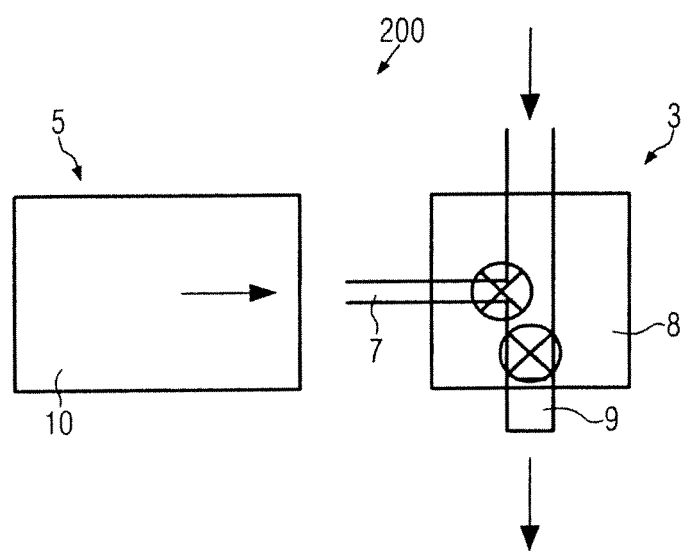
FIG. 3 is a greatly schematized depiction of a third embodiment of the disclosure.

FIG. 3 shows a further embodiment of a device 200 according to the disclosure, of which only a valve block 8 is depicted as a part of the blow-moulding station 3, whereby this valve block regulates the feed of blowing air from the blowing air line 9. A tempering device 5 with a climatic compressor 10 is connected to the blowing air line 9, whereby this climatic compressor 10 is connected to the valve block 8 for climatizing the blowing air by means of a circuit 7, here for the operating medium cold air. The climatic compressor 10 can be used both in the central variant in accordance with FIG. 1 and in the distributed variant of FIG. 2, in addition to or as an alternative to the provision devices for the heating and/or cooling medium. In the case of the distributed solution, the hosing can be integrated or assembled into the blow-moulding station as a standard component. If the climatic compressor is appropriately small/compact, the hosing can also be eliminated and a solution can be implemented that requires no decoupling possibility in the form of Stäubli couplings, because the mould 3a, 3b can be connected directly to the openings of the compressor (click connections). As a result, it is possible in a simple way to follow the movements of the mould or the mould halves.

The tempering with the help of the climatic compressor can be used as follows: The moulded container can be cooled actively during the holding time in the device 1, 100, 200. The cooling air can here be introduced by the valve block, or an additional bypass line must be provided. Heat can be removed from the blowing air by means of blowing cold air into the compressed air canal. Heat can be removed from the air that is compressed in the compressor. The preform can be selectively tempered, i.e., its temperature profile can be optimized shortly before the blowing. This is particularly expedient for a cooling of the neck ring after the preform has been delivered into the mould and the blowing nozzle has not yet been placed on to the neck ring. The mould can be tempered ahead of time if there is not yet a container in the mould, e.g., it can be preheated in the start-up status of the device or temporarily cooled if the mould becomes too hot, which is expedient in the case of the "hot fill" method. The neck ring can also be tempered.

The controller of the climatic compressor can be coupled to temperature measurements or other conditions in preceding system parts (e.g., oven) or subsequent system parts (e.g., filler or labelling machine), as a result of which an exact assignment of the containers to the preforms in a station-related/blowing wheel-related/oven chain-related manner is made possible and, as a result, tempering in the blow-moulding station is possible individually. The blow-moulding stations can be regulated individually or also in groups, and they can be connected to the described circuits individually or in groups.

In modification of the described and drawn embodiments, the disclosure can also be used in blow moulding machines with another construction, e.g., with a linear carrier.

The invention claimed is:

1. A device for blow moulding containers having a plurality of blow-moulding stations, each provided with at least one blow mould, wherein these blow-moulding stations are arranged on a driven carrier and are supplied with operating medium by means of a tempering device, wherein the tempering device is arranged on the carrier such that the tempering device runs along with the carrier,
   wherein the tempering device contains a provision device with a heating and/or cooling device for the provision of heating and/or cooling medium for the blow mould and/or for the container, and
   wherein a separate provision device for each blow-moulding station or for each group of blow-moulding stations is provided, the group of blow-moulding stations comprising a subset of the plurality of blow-moulding stations, the subset comprising less than the total number of blow-moulding stations.

2. The device according to claim 1, wherein the blow-moulding stations are supplied with operating medium independently of one another.

3. The device according to claim 1, wherein the tempering device contains a climatic compressor for climatizing the blowing air.

4. The device according to claim 1, wherein the tempering device contains a separate provision device for each blow-moulding station or for each group of blow-moulding stations.

5. The device according to claim 1, wherein each blow-moulding station has a separate operating medium circuit for each operating medium.

6. The device according to claim 1, wherein each blow-moulding station has a separate independent tempering control cycle.

7. The device according to claim 1, wherein the tempering device of each blow-moulding station contains assigned temperature sensing devices.

8. A method for blow moulding containers, wherein a plurality of blow-moulding stations, each provided with a blow mould, are transported on a driven carrier and supplied with operating medium by means of a tempering device, wherein the tempering device runs on the carrier along with the same, and in performing the method, the device according to claim 1 is used.

9. The method according to claim 8, wherein the blow-moulding stations are supplied with operating medium independently of one another.

10. The method according to claim 8, wherein the supply of each blow-moulding station is regulated independently of other blow-moulding stations.

11. The device of claim 1, wherein the driven carrier comprises a blowing wheel.

12. The method of claim 8, wherein the driven carrier comprises a blowing wheel.

* * * * *